United States Patent [19]

Morihashi

[11] E Patent Number: Re. 31,705

[45] Reissued Date of Patent: Oct. 16, 1984

[54] METHOD AND APPARATUS FOR PRODUCING SPUN YARN

[75] Inventor: Toshihumi Morihashi, Shiga, Japan

[73] Assignee: Murata Kikai Kabushiki Kaisha, Kyoto, Japan

[21] Appl. No.: 339,786

[22] Filed: Jan. 15, 1982

Related U.S. Patent Documents

Reissue of:

[64] Patent No.: 4,183,202
Issued: Jan. 15, 1980
Appl. No.: 730,349
Filed: Oct. 7, 1976

[30] Foreign Application Priority Data

Mar. 4, 1976 [JP] Japan ..... 51/23862

[51] Int. Cl.[3] ..... D02G 3/38; D01H 5/28; D01H 7/92

[52] U.S. Cl. ..... 57/224; 57/210; 57/328; 57/289; 57/333; 57/5; 57/350; 57/351

[58] Field of Search ..... 57/7, 51-51.6, 57/282, 284, 285, 287, 288, 289, 290, 328, 329, 330, 332, 333, 350, 351, 204, 205, 210, 224, 226, 227, 228, 254, 255, 5

[56] References Cited

U.S. PATENT DOCUMENTS

| | | | |
|---|---|---|---|
| Re. 27,717 | 8/1973 | Breen et al. | 57/289 X |
| 1,987,632 | 1/1935 | Nutter et al. | 57/252 X |
| 2,817,947 | 12/1957 | Strang | 57/7 |
| 3,303,169 | 2/1967 | Pitzl | 57/350 X |
| 3,423,809 | 1/1969 | Schmitt . | |
| 3,438,193 | 4/1969 | Kosaka et al. | 57/351 X |
| 3,443,292 | 5/1969 | Davis . | |
| 3,706,192 | 12/1972 | Leibbrand et al. | 57/290 |
| 3,729,918 | 5/1973 | Kawasaki et al. | 57/239 |
| 3,822,543 | 7/1974 | Edagowa et al. | 57/350 X |
| 3,911,655 | 10/1975 | London et al. | 57/289 |
| 3,944,166 | 3/1976 | Hermanns | 226/97 |
| 4,003,194 | 1/1977 | Yamagata et al. | 57/328 |
| 4,005,566 | 2/1977 | Hawkins | 57/350 |
| 4,056,924 | 11/1977 | Uminstowki | 57/51.6 X |

FOREIGN PATENT DOCUMENTS

| | | | |
|---|---|---|---|
| 2126 | 5/1962 | Japan | 57/51 |

*Primary Examiner*—Donald Watkins
*Attorney, Agent, or Firm*—Spensley, Horn, Jubas & Lubitz

[57] ABSTRACT

This present invention relates to a spun yarn having novel structure and a method of producing the same. The spun yarn of the present invention consists of a number of fibers arranged in a predetermined direction and twisted together, one end of which fibers is spirally wound around the surface of the yarn. The yarn of the present invention is spun by successively passing a sliver through a pneumatic yarn twisting device, untwisting tube, and false twisting device in turn. The twisting device, untwisting tube and false twisting device are disposed between front rollers and delivery rollers.

16 Claims, 9 Drawing Figures

METHOD AND APPARATUS FOR PRODUCING SPUN YARN

Matter enclosed in heavy brackets [ ] appears in the original patent but forms no part of this reissue specification; matter printed in italics indicates the additions made by reissue.

BACKGROUND OF THE INVENTION

This invention relates to a spun yarn having novel structure and a method of producing the same.

Recently, in order to obtain a variety of spun yarns which had appearances and feeling different from those of ring spun yarns and to perform a greatly increased spinning speed, there have been successively proposed an open end spinning process, false twist spinning process, etc. Such spun yarns thus produced were inferior to the ring spun yarns with regard to yarn uniformity, yarn strength, feeling, etc. Thus, satisfactory spun yarn cannot yet be obtained. The conventional process disclosed in Japanese Patent Publication No. 28250/1968 provides yarn twisted by a torque jet under no control resulting in no avoidance of the end of the staple fiber bundles over its aspirating jet. The staple fiber bunches thus tightened by twist do not have almost relief of twist. Therefore, the process necessitates a large number of free-ended fibers with the sliver fed at part of the front rollers being in a state of ribbon. The staple yarn thus spun has a yarn structure which has non-twisted wadding thread or core portion and is surrounded by the free-ended fibers of aforesaid ribbon shape on the outer periphery thereof (see FIG. 1). Further, both the nozzles were turned in opposite direction to each other as the improvement therefore, but better result cannot be obtained thereby.

Another conventional method of producing the spun yarn disclosed in Japanese Patent Publication No. 71226/1974 has indispensably provided a holding region under low tension of the staple fibers at the intermediate between a pneumatic nozzle and a false twisting nozzle with no respect to the normal or reverse rotating direction against the difficulties of spinning control by the width of the ribbon, but did not still disclose any propagation of twisting by a second nozzle over the holding region under low tension to the first nozzle. In such conventional method, the twisting caused by the first and second nozzles are intersected to each other in the holding region under low tension with the result that this method can produce SZ random twisted yarn (see FIG. 2).

SUMMARY OF THE INVENTION

It is, therefore, an object of the present invention to provide a novel spun yarn which has a specific structure and a method for producing the same.

It is a further object of the invention to provide a spun yarn which may preferably be spun of short fibers of length less than 38 mm heretofore difficult to be spun.

It is still another object of the invention to provide a spun yarn which is superior in yarn strength to the ring spun yarn.

It is still another object of the invention to provide a spun yarn which has a good feeling compared to the ring spun yarn.

It is still another object of the invention to provide a method of producing spun yarn at higher speed than that of the ring spinning process.

It is still another object of the invention to provide a spun yarn which has a variety of appearance and characteristics different from those of the ring spun yarn.

The spun yarn of the present invention comprises a twisted staple fiber strand, one end of which fiber is substantially disposed in the inner layer of the yarn thus produced and the other end of which fiber is substantially exposed out of the outer layer of the yarn and is wound therearound and in which the respective fibers are arranged in the same direction.

This present invention of the novel spun yarn and the method of producing the same taken with further objects and advantages thereof, will best be understood by reference to the following description taken in conjunction with the accompanying drawings.

DESCRIPTION OF THE PREFERRED EMBODIMENTS

Figure 1:
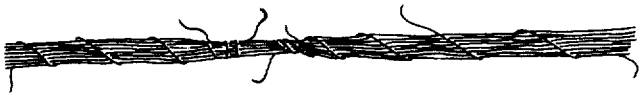
FIG. 1 PRIOR ART
FIG. 1 is an expanded view of the conventional spun yarn.
Figure 2:
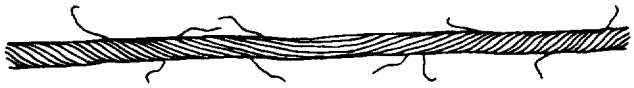
FIG. 2 PRIOR ART
FIG. 2 is an expanded view of another conventional spun yarn.

The fundamental principle of this present invention will now be described for convenience of better understanding of the spun yarn and the method of producing the same according to this present invention.

In the device for carrying out the method of producing the spun yarn having the novel structure constructed according to the invention, slivers, staple fiber bundles, are fed to a pneumatic yarn twisting device provided between a pair of front rollers and a pair of delivery rollers, passed through an untwisting tube and a pneumatic or non-mechanical false twisting device, and are delivered as a spun yarn. The staple fiber bundles thus fed to the false twisting device are imparted with strong false twist in the false twisting device. The strong twist thus applied to the fiber strand in the false twisting device is transmitted to the region of the pneumatic yarn twisting device through the untwisting tube making the strands loose and soft in twist thereof to the extent causing no yarn breakage. Thus, the staple fibers are loosely or softly twisted in the region of the pneumatic yarn twisting device. In such state the pneumatic yarn twisting device is so actuated as to loosely twist the staple fiber bundles thus softly twisted, maintaining constant balance with the loose twist thus provided so as not to produce the broken thread, the fibers are slipped among the staple fiber bundles thus loosely twisted. When the staple fiber bundles thus slipped among their fibers pass through the false twisting device, a great twist back acction is effected for the staple fiber bundles. Thus, when the false twist thus applied to the staple fiber bundles by the false twisting device returns to zero, the fibers thus slipped among them are balanced with the fibers not slipped so as to obtain actually twisted spun yarn.

The reason why mechanical yarn twisting device such as with rotary pins wound with the staple fiber bundles cannot be employed is that if the fibers are formed with knobs it becomes difficult to cause the slipping among the fibers. In order to effect preferably slipping among the fibers, a pneumatic yarn twisting device with an air injection nozzle would be preferred. The actual spinning machine may adopt other gas nozzles such as a steam nozzle, or liquid nozzle such as a water nozzle. The pneumatic yarn twisting device serves the functions of determining the actual twist of the staple fibers thus slipped among the fibers applied to the spun yarn thus produced so as to define the yarn strength. This pneumatic yarn twisting device has an effect of applying uniform twist in a predetermined direction of S or Z to the spun yarn thus produced by turning the balloon in one direction so as to thus make uniform quality of yarn thus produced.

It is, on the other hand, desirable that the false twisting device may rotate at high speed without ballooning in order to transmit uniform twisting to the vicinity of the front rollers. Applying a good deal of false twist to the staple fiber bundles by means of the high speed rotation of the false twisting device strengthens the untwisting action owing to its own inherent tortional restoring force of the staple fiber bunches upon passing of the staple fiber bundles through the aforesaid false twisting device, and increases the twisting action of the yarn thus produced so as thus to effect better attainment of smooth yarn being less fluffy, i.e., by the adjustment of the false twisting device, the second device, there are provided a variety of changes in appearance and feeling of the spun yarn thus produced.

Since the false twisting device merely serves to impart the false twist to the staple fiber bundles, it may employ the rotary pin or mechanical type, but from the reasons such as easiness of the initiation of spinning the yarn, no hurt of the fibers, etc., the pneumatic false twisting device by means of air injection nozzle is desired. Similarly, in addition to the above described pneumatic type, other liquid or gaseous type injection nozzle may also be used therewith within the spirits and scope of this present invention. Furthermore, in order to also employ steam set for the yarn together with the aforesaid type, the steam may also be injected therefrom in a similar manner as described above.

The provision of the rotating directions in counter direction between the pneumatic yarn twisting device and the false twisting device may facilitate a great deal of slips among the fibers of the staple fiber bunches fed to the pneumatic yarn twisting device and then to the false twisting device, which slips cause the spun yarn thus produced to be effected with the increase of actual twist so as to enhance the yarn strength to provide the condition to obtain the spun yarn of high quality.

An untwisting tube serves the functions of transmitting the strong false twist imparted to the staple fiber bundles by means of the false twisting device thus provided upon application of loose twist thereto into the region of the pneumatic yarn twisting device therethrough. The aforementioned untwisting tube also serves to positively contribute to the generation of the slips among the fibers of the staple fiber bundles. More particularly, the mechanical collisions of the staple fiber bunches in the untwisting tube remarkably increases the slips among the fibers of the staple fiber bundles. Accordingly, it should be noted that when the pneumatic yarn twisting device provides the balloon effect, it further enhances greatly the production of the slips among the fibers of the staple fiber bundles by means of the organic connection of the fluctuation effect of aforesaid balloon with respect to the staple fiber bundles so as to thus greatly increase the yarn strength.

In addition to the above slippage effect of the staple fiber strands, abrupt untwisting action occurs at the untwisting tube for converting the strong false twist of the staple fiber strands to be transmitted therealong into loose or soft twist of the staple fiber strands. It is considered that a swelling and expansion are caused among the fibers of the staple fiber strands at the untwisting tube so as to easily produce the slips and displacements among the fibers of the staple fiber strands. That is, it will be understood by those skilled in the art that since the operation of the untwisting tube of this present invention is very important, suitable frictional force and resistive force of the untwisting tube must be selected with regard to the quality of the fibers, thickness, quality, strength and spinning speed of the yarn thus produced. The frictional force and resistive force of the untwisting tube can be varied according to the material, inner diameter, length of the untwisting tube and the shape of the surface of the tube in contact with the yarn. If the frictional force of the untwisting tube is excessively large, it causes yarn breakage. If there is not provided a balloon control ring, which will hereinafter be described in greater detail, the untwisting tube may control the balloon generated at both nozzles so as to prevent the random interference of both the balloons of the nozzles.

Particularly, it is to be noted that if the rotating direction of the pneumatic yarn twisting device is reverse with respect so that the false twisting device, it greatly increases the untwisting action or effect of the staple fiber bundles. More particularly, it is considered that the direction of twisting of the staple fiber bundles transmitted from the false twisting device in a manner abruptly loosely untwisted at the untwisting tube becomes opposite or in counter relation to the direction of twisting of the staple fiber bundles imparted by the pneumatic yarn twisting device in a manner rapidly untwisted at the untwisting tube, which twisting is actually acted as a twisting brake of the false twisting nozzle to be thus preferably called a brake force, resulting in occurrence of large twist transfer point from the one to the other caused by the summing-up of the aforementioned two loose untwisting actions in order to assist the swelling and expansion of the staple fiber bundles among the fibers of said bundles. It should be noted that the slipping and displacement of the fibers tend to be feasible in counter direction between the pneumatic yarn twisting device and the false twisting device rather than in the same direction therebetween with regard to the rotating directions of the pneumatic yarn twisting device and false twisting device. According to the results of experiments, it has been confirmed that if the rotating direction of the pneumatic yarn twisting device is opposite to that of the false twisting device to each other, the yarn strength of the staple fiber strands is greatly increased.

In case where the rotating directions of the pneumatic yarn twisting device and false twisting defice are provided in counter direction as previously described with each other, the twist transfer point is thus produced at any point, but it is considered that such twist transfer point is thus fixed to the position of the untwisting tube as described above by the provision of the untwisting tube with the result that there is thus provided a spun yarn thus arranged and twisted uniformly in a predetermined direction. It was found in the experiment of the provision of the untwisting tube that the aforementioned effect and fact was proved on the appearance and configuration of the spun yarn from the result of the experiments.

According to the conventional method of producing the spun yarn without such untwisting tube or device, the twisting of the false twisting device is easily transmitted excessively to the front rollers or is sometimes transmitted upto the front rollers unstably, camming the strength of the spun yarn thus produced to be reduced or decreased.

Figure 3:
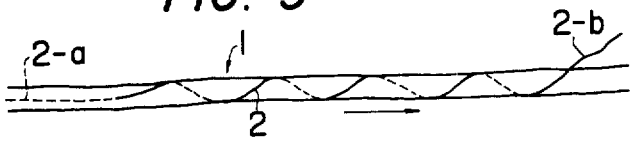
FIG. 3 is an explanatory view showing the structure of the spun yarn produced according to this present invention.
Figure 4:
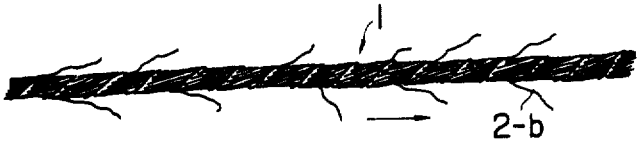
FIG. 4 is an expanded view of the spun yarn constructed in accordance with this present invention.

The spun yarn 1, as illustrated in FIGS. 3 and 4, which show one preferred embodiment of the spun yarn constructed according to this present invention, obtained by the method of producing the spun yarn of the invention with the spinning machine used therefor, is seen to comprise a staple fiber strand containing a fiber 2 extending along the yarn passage (see an arrow in the figures), one rear end 2-a of which fiber 2 is substantially disposed in the inner layer of the yarn thus produced and the other front end 2-b of which fiber 2 is substantially exposed to form a fluff 2-b in such a manner that the front portion to the front end 2-b of the fibers is actually wound around the outer layer of the yarn thus produced. When the spun yarn of this present invention is repetitively drawn through one's hand several times strongly in both directions, pillings are produced on the spun yarn in only one direction to produce rough surface of the yarn, whilst smooth surface in the other direction in the spun yarn formed by the present invention, whereas nothing occurs in the spun yarn constructed according to the conventional method. Thus, even without microscopic observation, it is easy to distinguish the spun yarn of this present invention from that of the conventional method from the aforesaid fact.

It will be understood from the foregoing description that in case where the rotating directions of the pneumatic yarn twisting device and false twisting devices are in counter direction with each other, it is observed that the twisting direction (torque direction) of the spun yarn thus produced is opposite to that of the staple fiber strands transmitted from the false twisting device to the pneumatic yarn twisting device, which fact is in correspondence to the aforementioned description.

Reference is now made to the drawings, in which there are illustrated schematically the spun yarn and the apparatus for executing the method of producing the same as preferred embodiments, which will now be described together with the experimental results.

Figure 5:
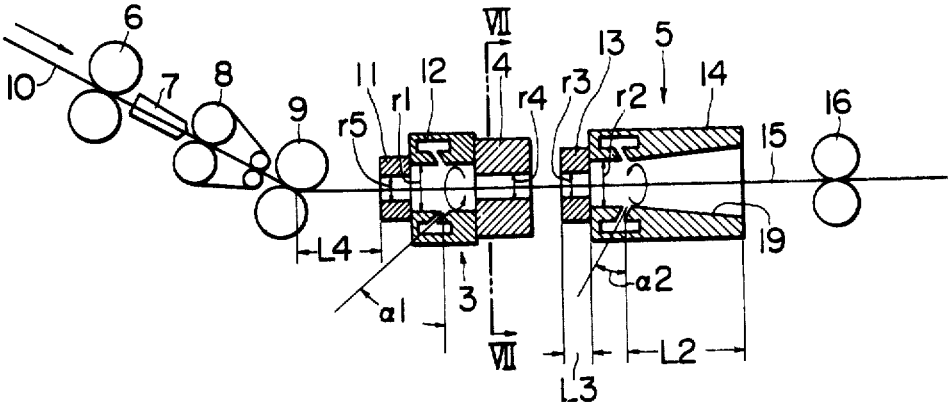
FIG. 5 is a schematic view partly in section of one embodiment of the device for practising the method of this present invention.

In FIG. 5, which indicates one preferred embodiment of the device for executing the method of producing the spun yarn of this present invention, reference numeral 3 is illustrating a pneumatic yarn twisting device, and 4 is an untwisting tube, and 5 is a false twisting device. A staple fiber bundle 10 fed from a pair of back rollers 6 through a condenser 7, a pair of apron rollers 8 and a pair of front rollers 9 is sequentially passed through a balloon control ring 11, the first air injection nozzle 12, the untwisting tube 4, a balloon control ring 13 and the second air injection nozzle 14. The staple fiber bundle 10 thus fed through the aforementioned respective components and parts is delivered through a pair of delivery rollers 16 as a spun yarn 15 and is then taken up by a take-up device such as a take-up bobbin (not shown).

Figure 6:
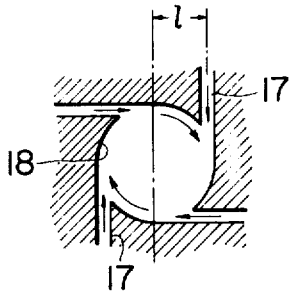
FIG. 6 is a sectional view of the air injection nozzle taken along the line perpendicular to the axis of the yarn passage tube of the nozzle.

As shown in FIG. 6, which depicts one example of the air injection nozzles in section vertical to the axis of a yarn passage tube 18 thereof, a plurality of air injection ducts 17 are provided in the air injection nozzles to open obliquely toward the staple fiber bundle advancing direction with angles $\alpha_1$ or $\alpha_2$ between the axis of the air injection duct 17 and the perpendicular to the center axis of the air injection nozzles (see FIG. 5), and in tangential direction to the axis of the yarn passage tube 18. A herical air current toward the staple fiber bundle advancing direction is produced in the yarn passage tube 18 by the injected compressed air applied from the air injection ducts 17, whereby the spun yarn bundle and fibers therein are helically turned and delivered along the yarn advancing direction. It was found from experiments that the desirable feeding rate of the staple fiber bundle between the front rollers 9 and the delivery rollers 16 was substantially 1:1. This proves that the fibers among the staple fiber bundle which are loosened and softened and being between the untwisting tube and the front rollers 9 are slipped and displaced to the extent corresponding to the twist contraction caused by the twist by means of the false twisting device so as to obtain the spun yarn having smooth appearance and feeling without curl and other defects.

Figure 8:
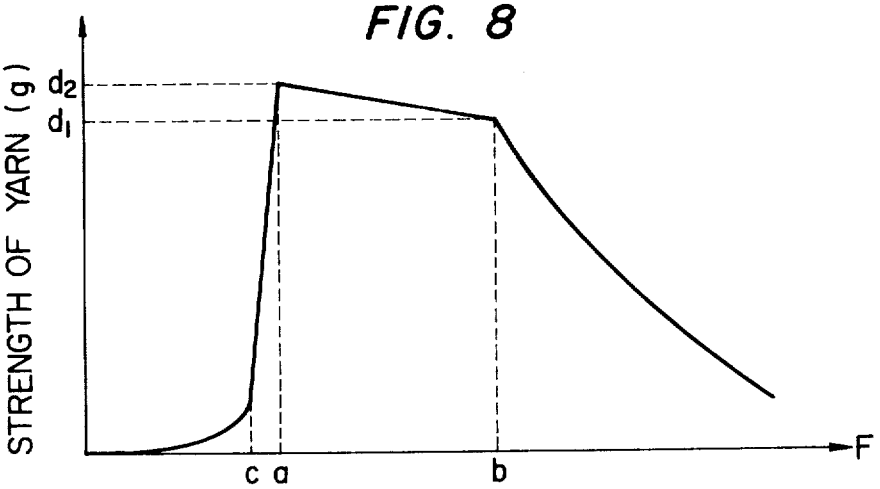
FIG. 8 is a graph showing the relationship between the loose twisting degree of the staple fiber strand in the yarn twisting device and the yarn strength.

It should be appreciated as will be described in greater detail that the aforesaid respective components and parts such as balloon control ring 11, first air injection nozzles 12, untwisting tube 4, etc. cause an effect organically with the other elements or components so as to produce specific balanced state so that the variations of set conditions of dimensions, shapes and pressure, etc. of one or more elements or components create the same spinning state as a whole while being different in the respective set conditions so as to obtain the same spun yarn of equal quality and stability. For example, as illustrated in FIG. 8, which shows a graphical representation of the relationship between the loose twisting degree of the staple fiber strand in the yarn twisting device and the yarn strength, wherein the coordinates adopt the yarn strength at an ordinate and the loose or soft twisting degree (F) of the staple fiber strand at an abscissa, it represents qualitative experimental result.

This loose or soft twisting degree (F) can be expressed in the following equation:

$$F = A \cdot (P_2/P_1) + B$$

wherein constants A and B in the above equation will be determined depending upon the shape and dimensions of the pneumatic yarn twisting device, the shape and dimensions of the false twisting device, the shape and dimensions of the untwisting tube, types of the raw materials, the yarn counting of the spun yarn to be spinned, spinning speed or velocity, and the shape and dimensions of the ballooning controller, reference character $P_1$ signifies the set pressure of the pneumatic yarn twisting device, $P_2$ the set pressure of the false twisting device, preferably more than 2 kg/cm$^2$ and less than 6 kg/cm$^2$ in consideration with its economy.

Figure 9:
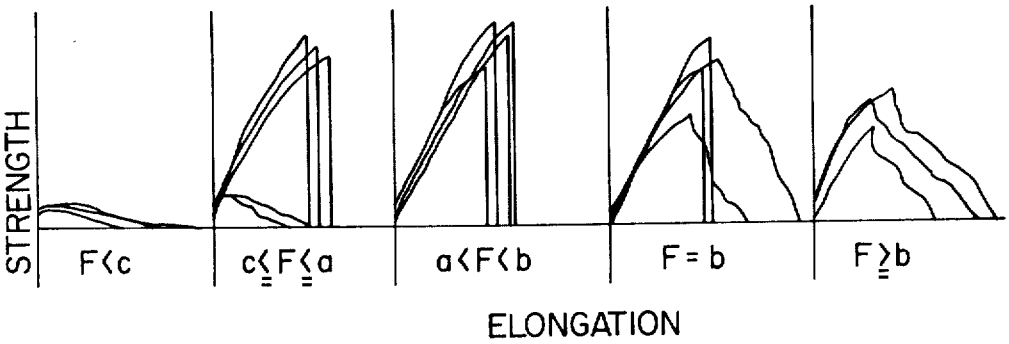
FIG. 9 is a graph showing the curve of the yarn strength versus elongation of the staple fiber strand at the respective points shown in FIG. 8.

If the loose twisting degree (F) does not satisfy the following formula $$a<F>b$$

there is produced insufficient spun yarn as represented by the curve of the yarn strength versus the elongation of the staple fiber bundle in FIG. 9. Therefore, there exists a large room for factors of design change or alternation in consideration with the easiness of the workability and the compactness of the spinning machinery, etc. Such room for design change or alternation may flexibly respond to the means fiber length of the fibers of the staple fiber bunch, yarn counting of the spun to be produced, quality, appearance, yarn tension and spinning speed of the spun yarn to be produced so as to attain the spun yarn of the type having a broad variety of high quality. It will be understood from the foregoing description that an important factor resides in the spinning state of the spun yarn that the loose or soft twisting of the staple fiber strand to the degree in which no yarn breakage is occurred, is transmitted to the vicinity of the front rollers and the yarn twisting device acts the fibers in the loose twist state of the staple fiber strand as the common factors of these respective cases.

It is to be noted that in case where the pneumatic yarn twisting device 3 and the false twisting device 5 may employ the wir injection nozzles as has been heretofore described, the front rollers 9 may be always rotated at the starting of spinning, and the roller pair trains of the back roller 6, the apron rollers 8 and the front rollers 9 may start to inject the respective nozzles and to thus feed the staple fiber bundle 10 toward the first air injection nozzles 12 and may stop regardless of the stoppage of the respective nozzles at the stopping of spinning. Thus, the starting and stopping of spinning can be extremely simply conducted fastly in one touch operation far compared with the conventional ring spinning, open-ended spinning, etc. Furthermore, this can also be proved from the fact that the apparatus for performing the method of producing the spun yarn of this present invention may provide 180 to 200 m/min. in term of British yarn counting Ne 45 and 200 to 250 m/min. in term of British yarn counting Ne 30 in comparison with 15 m/min. by the conventional ring spinning, 30 to 40 m/min. in term of British yarn counting Ne 45 and 50 m/min. in term of British yarn counting Ne 30 by the conventional open-ended spinning at the spinning speed.

According to the experimental results, it will be appreciated that the larger the inner diameter r1 of the first air injection nozzles 12, is the better on the condition that the staple fiber bundle is smoothly twisted and strand at the inner wall thereof so as to form a conical shape 19, and further that the inner diameter r3 of the balloon control ring 13 is better if it is smaller in the range that the staple fiber bundle may smoothly pass therethrough, and moreover that the length L3 of the balloon control ring 13 integrally provided to the second air injection nozzle 14 is better within a predetermined range if it is longer and is limited exceeding a predetermined length.

It will be understood from the foregoing description that the aforementioned results fairly coincide with the explanation of the fundamental principle of this present invention as has been heretofore described.

More particularly, it is considered that the enlargement of the inner diameter r1 of the first air injection nozzle 12 permits the balloon to be broadened so as to increase the centrifugal force and inertia force of the balloon and to thus broaden or expand the staple fiber bundle or increase the twist brake action to easily cause the occurrence of the slippage and displacements of the fibers among the fibers of the staple fiber strand. At this time, the balloon control ring 11 may function to control the balloon. This fact can also be proved from the experimental result that assuming that the inner diameter of the first air injection nozzle 12 is constant as shown in FIG. 6 and also that the displacement of the injection ducts 17 of the air injection nozzles 12 from the center of the staple fiber bundle passage of the air injection nozzles 12 is varied, the larger the displacement "1" of the injection ducts 17 of the injection nozzle 12 becomes, the stronger the yarn strength becomes so as to stabilize the spinning state of the spun yarn. In this example, the inner diameter r1 of the first air injection nozzle 12 effects similarly to the injection force of the air from the first air injection nozzle 12 a clearly understood from the aforementioned description. If this effect extremely exceeds, the staple fiber bundle becomes excessively untwisted more than required so that the twisting of the staple fiber bundle from the second air injection nozzles 14 is stopped to cause insufficient spinning of the spun yarn and to finally cause the yarn breakage to the worst. On the contrary, if this effect is extremely small, the twisting of the staple fiber strand from the second air injection nozzle 14 is excessively propagated to cause no slips and displacement of the fibers among the fibers of the staple fiber strand between the untwisting device 4 and the front rollers 19 so as to produce insufficient spun yarns and to thus introduce sometimes the yarn breakage to the worst.

It is also considered that the decrease of the inner diameter r2 of the false twisting nozzle 14 permits large false twist to the staple fiber strand by increasing the rotating speed as fast as possible and also that the extention of the length L2 from the injection duct of the second air injection nozzle 14 to the outlet port end of the injection nozzle 14 to a predetermined length to form a conical surface 19 (see FIG. 5) causes the injected air from the injection nozzle 14 to flow smoothly with less resistance as possible so as to restrict the turbulence and fluctuation of the staple fiber strand in waste motion thereby effectively converting the injected air energy to the twisting action of the staple fiber bundle as much as possible. It is to be noted that the settlement of the inner diameter r3 of the balloon control ring 13 less than the inner diameter of the second air injection nozzle 14 and the restriction of the length L3 of the balloon control ring 13 as was heretofore described permit to control the balloon taken place at the second air injection nozzle 14 and also to prohibit the interference of the previous balloon with the balloon occurred at the first air injection nozzle 12 and to provide the point of application of the twisting produced at the false twisting device 5 so as to stably transmit the twisting to the staple fiber bundle toward the front rollers 9. It should also be noted that the provision of the inner diameter of the balloon control wing 13 less than that of the second air injection nozzle 14 rather than the inner diameter of the false twisting device 5 functions to limit the intaken air amount to a minimum quantity required for absorbing the staple fiber bundle in order to enhance the false twisting force of the second air injection nozzle 14.

It should also be appreciated that the inclined angle a2 of the injection duct 17 of the second air injection nozzle 14 with respect to the axial direction thereof be preferably about 90° as near as possible so as to obtain good result, which fact pertains to the aforementioned description for the reason of converting the injected air energy to the twisting action of the staple fiber bundle as much as possible.

This arrangement of the apparatus for executing the method of producing the spun yarn is provided to ensure similar best inclined angle $\alpha_1$ of the injection duct 17 of the first air injection nozzle 12 with respect to the axial direction thereof at substantially 48°. This is because the first air injection nozzle 12 has two functions to deliver the staple fiber bundle toward the first injection nozzle 12 and to spirally twist the staple fiber bundles thus delivered.

Figure 7:
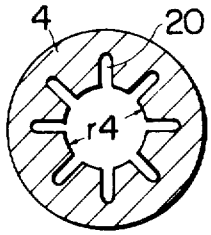
FIG. 7 is a sectional view of the device along the line VII—VII in FIG. 5.

The untwisting tube 4 may have radial grooves 20 passing from the front end thereof to the rear end along the axis thereof as shown in FIG. 7, which illustrates the lateral sectional view of the untwisting tube 4 used as one example for the apparatus for executing the method or producing the spun yarn of the invention, thereby greatly increasing the yarn strength. In the above described untwisting tube 4, the inner diameter r4 must be smaller than the inner diameter r1 of the first air injection 12. If the inner diameter r4 of the untwisting tube 4 is excessively smaller than the inner diameter r1 of the first air injection nozzle 12, the untwisting tube 4 also forming the air passage integrally provided to the first injection nozzle 12 tends to disturb the smooth discharge of the injected air from the first air injection nozzle 12 to effect badly the spun yarn thus produced and the spinning state of the spun yarn. However, the establishment of the radial grooves 20 at the untwisting tube 4 causes the injected air to be exhausted therethrough so as to eliminate such disadvantage. It is considered that the radial grooves 20 of the untwisting tube 4 serves, as previously described, the function of greatly strengthening the yarn strength because the staple fiber bundle tends to contact the groove 20 thus provided and to thereby helically twist it so as to accelerate the expanding and distributing action of the fibers among them of the staple fiber bundle. It will be understood from the foregoing description that arbitrary selection of the number of the radial grooves 20 of the untwisting tube 4 highly varies the appearance and yarn strength of the spun yarn thus produced. According to the present invention, it will be clear that the fluffy amount of the spun yarn thus produced may be controlled by means of the pneumatic pressure of the second air injection nozzle 34.

Some of the features and advantages of this present invention will be also seem from the following example:

One example was conducted with raw materials of ester of 65 parts and of cotton of 35 parts of yarn counting Ne 45, using a spinning speed of 200 m/min. under the same conditions, and the results as disclosed in the following Table were attained. More particularly, the method of producing the spun yarn thus executed according to this present invention with the apparatus constructed as previously described and could stably spin out the spun yarn of high quality.

| | | | | | | | | | |
|---|---|---|---|---|---|---|---|---|---|
| | P1 | 3 | 3 | 6 | 6 | 6 | 6 | 6 | 2 |
| | P2 | 3 | 6 | 1 | 2 | 3 | 3 | 6 | 6 |
| I | S (g) | 242 | 235 | 70 | 40 | 241 | 236 | 230 | 170 |
| | U (%) | 11.5 | 11.6 | — | — | 11.4 | 11.2 | 11.3 | 12.0 |
| | N | 176 | 20 | — | — | 170 | 33 | 15 | 22 |
| II | S (g) | 170 | 100 | 70 | 230 | 245 | 235 | 180 | 120 |
| | U (%) | 11.1 | — | — | 11.2 | 11.3 | 11.6 | 11.5 | 12.0 |
| | N | 180 | — | — | 267 | 174 | 40 | 18 | 20 |

P1 — pressure of pneumatic yarn twisting device
P2 — pressure of false twisting device
I — diameter of untwisting tube r4 is 1.5ϕ
II — diameter of untwisting tube r4 is 2ϕ
S — strength of yarn
U — unevenness of yarn
N — number of fluffs in 10 m, which are longer than 3 mm It is recognized that according to this present invention the fluffy amount of the spun yarn thus produce may be controlled arbitrarily by means of the pneumatic pressure of the false twisting device 5.

It should be understood from the foregoing description that the spun yarn of this present invention provides the yarn of uniform and highly quality other than the conventional ring spun yarn, with a variety of appearance and configurations. It should also be understood that the method of producing the spun yarn provides to spin out the yarn at extremely higher speed than before with remarkably simple operation so as to save the man-power problem recently required.

What is claimed is:

1. The method of producing a spun yarn comprising the steps of passing a staple fiber bundle through pneumatic twisting means, through an untwisting tube and through a false twisting means in line and in that order with the internal diameter of the untwisting tube being smaller than the internal diameter of the pneumatic twisting means and the false twisting means to effect ballooning of the fiber bundle between the front rollers and the untwisting tube and loosening and slipping of the fibers of the bundle in the pneumatic twisting means.

2. The method as set forth in claim 1 and further including the step of directing air over the staple fiber bundle in the pneumatic yarn twisting means obliquely toward the staple fiber bundle in the direction of advance of the staple fiber bundle and tangentially to the axis of advance of the staple fiber bundle through the pneumatic yarn twisting means.

3. The method as set forth in claim 2 and further including the step of controlling the ballooning of the fiber bundle prior to the fiber bundle's entry into the pneumatic yarn twisting means.

4. The method as set forth in claim 1 and further including the step of directing air over the yarn in the pneumatic yarn twisting means obliquely toward the yarn in the direction of advance of the yarn and tangentially to the axis of advance of the yarn through the pneumatic yarn twisting means.

5. The method as set forth in claim 4 and further including the step of controlling the ballooning of the yarn between the untwisting tube and the false twisting means.

6. The method as set forth in claim 1 and further including first passing the staple fiber bundle through a pair of frost rollers directly to the pneumatic twisting means and passing the spun yarn from the false twisting means directly through a pair of delivery rollers.

7. The method as set forth in claim 2 and further including the step of directing air over the yarn in the false twisting means obliquely toward the yarn in the direction of advance of the yarn and tangentially to the axis of advance of the yarn through the false twisting means and in a direction tangentially opposed to that of the air directed tangentially over the staple fiber bundle in the pneumatic yarn twisting means.

8. Structure for producing a spun yarn comprising a pneumatic yarn twisting means, a untwisting tube and a false twisting means constructed and arranged to receive a staple fiber bundle and to pass the staple fiber bundle therethrough in that order, said pneumatic yarn twisting means and false twisting means having larger internal diameters than the internal diameter of the untwisting tube.

9. Structure as set forth in claim 8 and further including a pair of front rollers before the pneumatic yarn twisting means and a pair of delivery rollers subsequent to the false twisting means with no intermediate structure between the front rollers and pneumatic yarn twisting means and between the delivery rollers and false twisting means.

10. Structure as set forth in claim 9 and further including a balloon control ring between the front rollers and the pneumatic yarn twisting means, and a balloon control ring between the untwisting tube and the false twisting means.

11. Structure as set forth in claim 8 wherein the internal diameter of the false twisting means is progressively larger in the direction of travel of the yarn therethrough.

12. Structure as set forth in claim 8 and further including means for directing air over the yarn in the pneumatic yarn twisting means obliquely toward the yarn in the direction of advance of the yarn and tangentially to the axis of advance of the yarn through the pneumatic yarn twisting means.

13. Structure as set forth in claim 8 and further including means for directing air over the yarn in the false twisting means obliquely toward the yarn in the direction of advance of the yarn and tangentially to the axis of advance of the yarn through the false twisting means and in a direction tangentially opposed to that of the air directed tangentially over the yarn in the pneumatic yarn twisting means.

*14. A spun yarn having a uniform direction of twist comprising:*

*a plurality of fibers, wherein a portion of at least some of said fibers are wound about the exterior of said yarn, each such fiber having one end disposed in the interior of the yarn and the other end exposed on the exterior of the yarn wherein said exposed other ends extend in a substantially uniform angle with respect to the axis of the yarn.*

*15. A spun yarn as in claim 14 wherein at least some of said fibers are less than about 38 mm in length.*

*16. A spun yarn formed from fibers arranged and twisted in the same direction, a proportion of said fibers having first ends disposed in the interior of the yarn, and being at least partly wound about the outer surface of the yarn and having their second ends exposed, wherein a real twist is present throughout the entire yarn and wherein said exposed second ends are directionally uniform.*

* * * * *